Feb. 19, 1957
V. MOORE
2,781,634
COMPRESSOR FLOW CONTROL MEANS
Filed Nov. 1, 1950
2 Sheets-Sheet 2
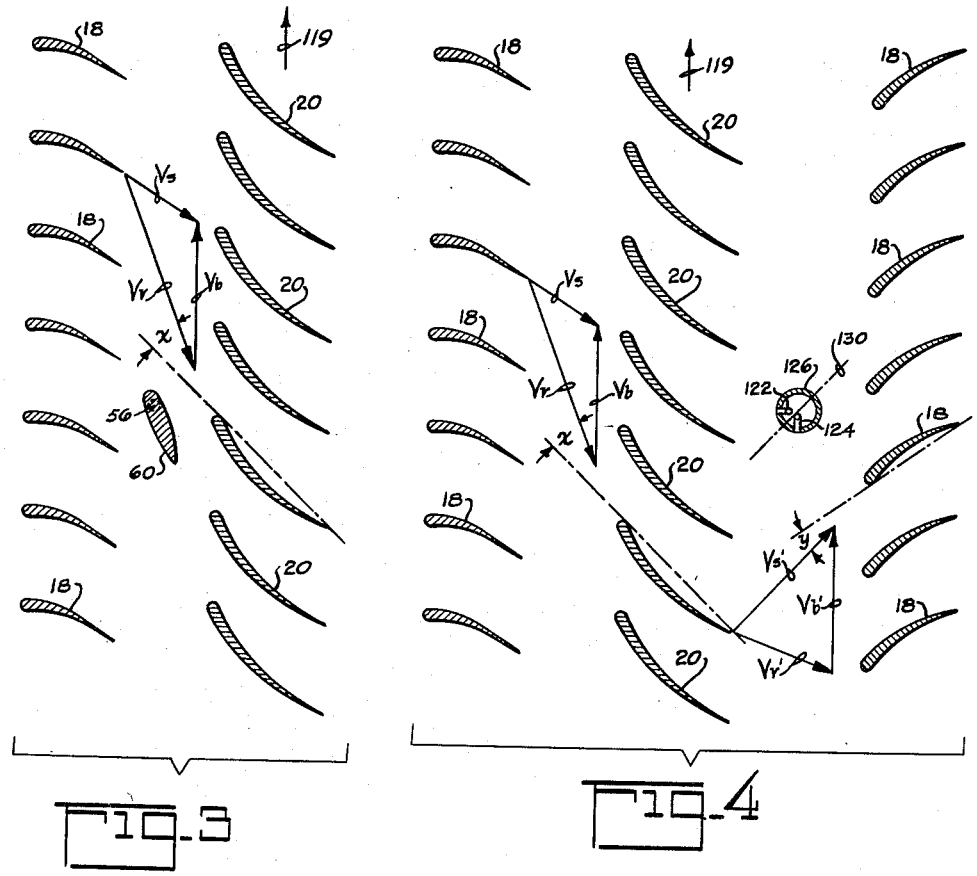
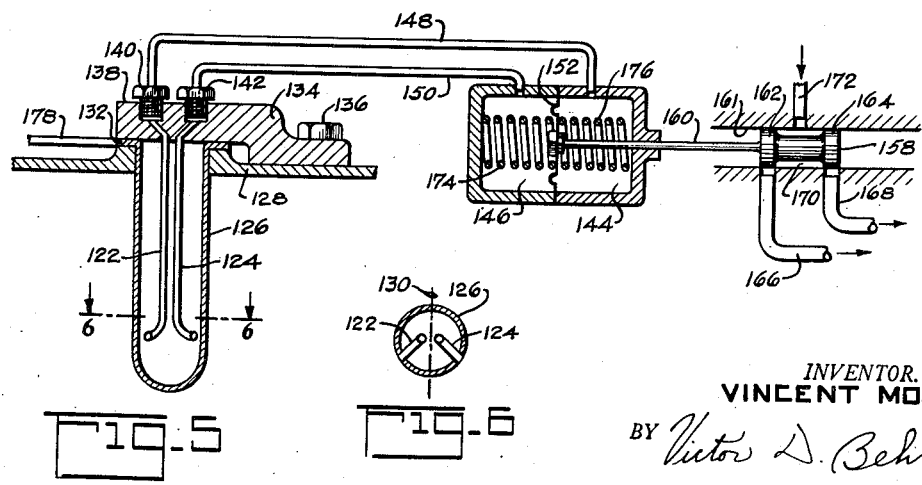
INVENTOR.
VINCENT MOORE
BY Victor D. Behn
ATTORNEY

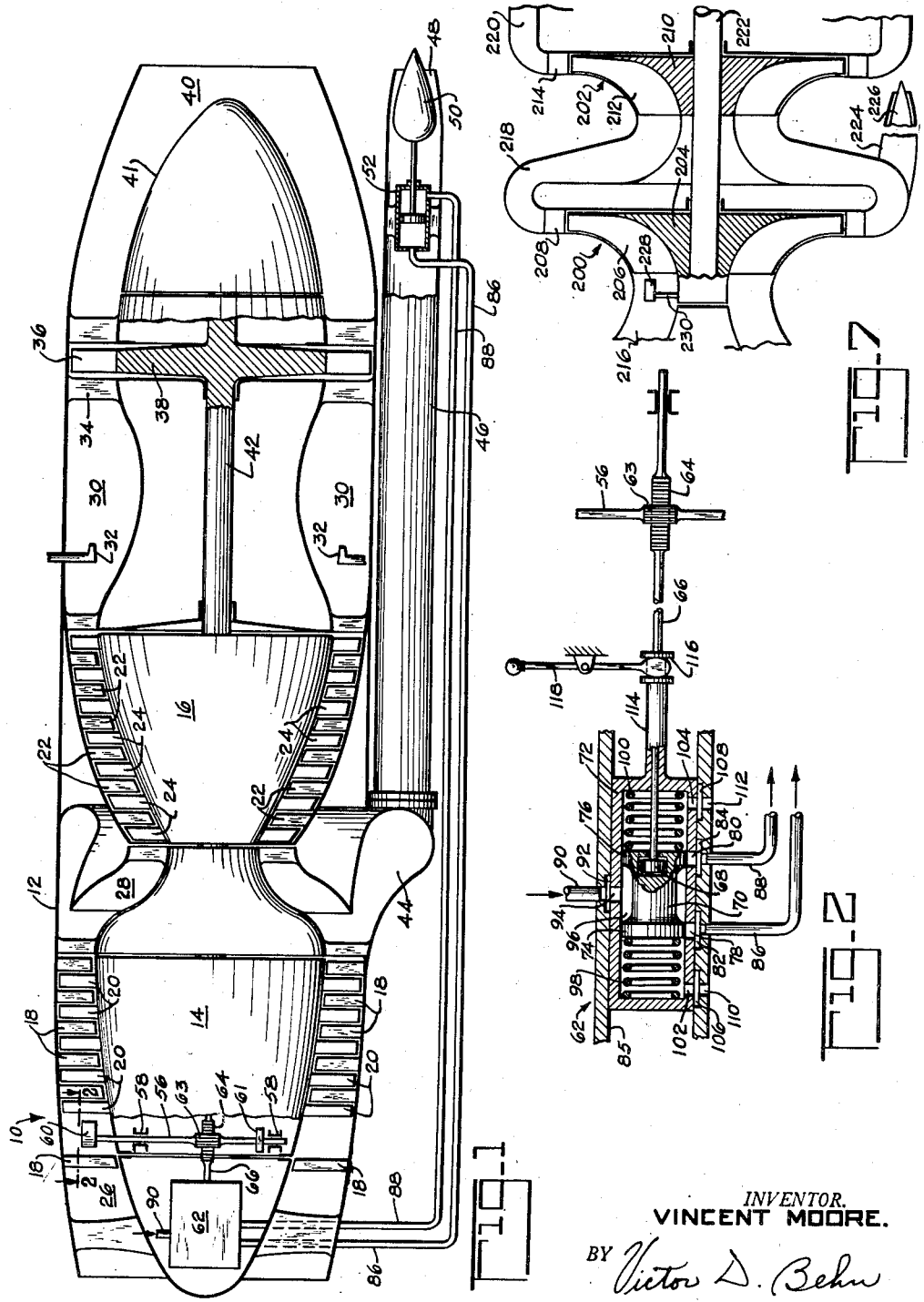

United States Patent Office 2,781,634
Patented Feb. 19, 1957

2,781,634

COMPRESSOR FLOW CONTROL MEANS

Vincent Moore, Glen Rock, N. J., assignor to Curtiss-Wright Corporation, a corporation of Delaware Application November 1, 1950, Serial No. 193,376

1 Claim. (Cl. 60—35.6)

This invention relates to compressors and to gas turbine power plants and is particularly directed to means for improving the performance of a compressor of the axial flow and/or the centrifugal types and the performance of a gas turbine power plant having such a compressor.

At a given speed of rotation, a compressor of the axial flow or centrifugal type operates satisfactorily over only a limited range of air flow therethrough. This is particularly true of multi-stage axial flow compressors. When the flow of air or other gaseous fluid through the compressor falls below this range, at least the initial stage or stages of the blades of a multi-stage axial flow compressor stall and a compressor surge condition may develop. The number of stages of the compressor blades which must stall before the compressor surges will vary with the compressor design. In the case of an air compressor of a gas turbine power plant, such as for aircraft, the compressor is required to operate over a wide range of air flow therethrough as well as over a wide speed range. An object of the present invention comprises the provision of automatic means for preventing the occurrence of compressor surge and/or stall conditions notwithstanding compressor operation over a wide speed and air flow range.

In accordance with the present invention air is bled off from a compressor at some point downstream of the compressor inlet and the rate of this air bleed is automatically controlled so as to prevent stalling of the compressor. For this latter purpose said rate of air bleed is automatically controlled by means responsive to changes in the angle of attack of the compressor air at a particular stage of compressor blades upstream of the stage at which said air is bled off, the rate of air bleed being varied so that said angle of attack is maintained at a desired value.

A gas turbine power plant for aircraft conventionally comprises a combustion chamber assembly, an air compressor assembly for supplying said combustion chamber with compressed air for combustion and for cooling the combustion gases, and a turbine assembly driven by the gases from the combustion chamber. In addition said turbine assembly is drivably connected to the compressor assembly and the turbine exhaust gases discharge rearwardly through a nozzle to provide the power plant with forward propulsive thrust. In the case of a gas turbine power plant incorporating said invention, the air bled off from the compressor is discharged rearwardly through an auxiliary nozzle to add to the propulsive thrust of the power plant. The addition of said air bleed and auxiliary nozzle to a gas turbine power plant not only minimizes the occurrence of surge and/or stall conditions in the compressor but also improves the performance of the gas turbine power plant by increasing the power plant thrust for a given rate of fuel consumption.

Other objects of the invention will become apparent upon reading the annexed detailed description in connection with the drawing in which:

Figure 1 is a schematic sectional view of an aircraft gas turbine power plant embodying the invention;

Figure 2 is an enlarged sectional view of a portion of Figure 1;

Figure 3 is a view taken along line 2—2 of Figure 1 and illustrating various velocity vectors thereon;

Figure 4 is a view similar to Figure 3 but illustrating the angle of attack responsive means disposed ahead of a stage of stator blades instead of, as in Figure 3, ahead of a stage of rotor blades;

Figure 5 is a diagrammatic sectional view of a modified form of angle of attack responsive means;

Figure 6 is a sectional view taken along line 6—6 of Figure 5; and

Figure 7 is a schematic partial view illustrating the invention applied to a centrifugal type compressor.

Referring first to Figures 1 and 2 of the drawing, a gas turbine power plant 10 for propulsion of aircraft comprises a housing 12 in which two multi-stage axial flow compressors 14 and 16 are disposed in series. The upstream axial flow compressor comprises a plurality of stator blades 18 extending radially inwardly from the housing 12 into the annular air flow path and alternating with a plurality of stages of rotor blades 20 extending radially outwardly from the compressor rotor into said path. The downstream or second axial flow compressor 16 similarly comprises a plurality of stages of stator blades 22 alternating with a plurality of stages of rotor blades 24. The compressor 14 receives air through an annular air intake duct 26 and said compressor discharges compressed air into an annular duct 28 from which said air enters the second compressor 16. The second compressor 16 further compresses said air and supplies it to a combustion chamber 30 to which fuel is supplied through nozzles 32. The discharge end of the combustion chamber is provided with vanes or nozzles 34 which direct the gases discharging therefrom against the blades 36 of the turbine rotor 38 for driving said rotor. The exhaust gases from the turbine discharge rearwardly from the power plant into the surrounding atmosphere through a nozzle 40 to provide the power plant with forward propulsive thrust. The tail cone 41 of the power plant may be axially movable for varying the area of the exhaust nozzle opening 40 as is quite common, for example see Patent Numbers 2,520,967 and 2,529,973. The turbine rotor 38 is drivably connected to the compressors by the shaft 42. The turbine 38 may also be connected to a conventional aircraft propeller (not shown) for providing at least a portion of the power plant thrust as is well known, for example see Patent Number 2,529,973. The compressors 14 and 16 may be driven by the turbine rotor 38 at the same speed or change gearing (not shown) may be interposed between said compressors. This latter feature is also well known, for example see Fig. 14 of Patent Number 2,396,911. In addition the power plant may include two serially disposed turbines each connected to one of the compressors (for example as illustrated in the copending R. W. Cole application Serial No. 25,942, filed May 8, 1948, now abandoned) and one of said turbines may also be drivably connected to said propeller for providing at least a portion of the power plant thrust. The gas turbine power plant structure so far described is conventional.

If at a given compressor rotative speed, the volume air flow rate through the compressor assembly is progressively decreased a point will be reached at which the angle of attack of the air on the first stage of compressor blades becomes so large that said stage stalls. Upon still further reduction in said volume flow rate the second stage of the compressor blades will stall, etc., and the compressor assembly generally will go into a surge condition before all of its stages reach a stalling condition. It is known that bleeding air from the compressor assembly increases the volume flow rate through the compressor and therefore eliminates or at least minimizes said surge. Since the first or upstream stages of the compressor blades stall first, the air need not be bled from the discharge end of the compressor assembly but can be bled from the compressor assembly at some intermediate stage. Figure 1 illustrates the compressor assembly as comprising two compressors 14 and 16 in series so that the most convenient place for bleeding air from said assembly is between the two compressors 14 and 16. For this purpose an annulus 44 communicates with the passage 28 between the two compressors 14 and 16 and a duct 46 extends rearwardly from the annulus 44 and terminates in a rearwardly directed discharge nozzle 48. It will become apparent that the second compressor 16 is not essential to applicant's invention and can be dispensed with, in which case the bleed duct 46 could still communicate with the compressor assembly 14 at the discharge end of said assembly or said duct could communicate with the assembly 14 at an intermediate stage.

The rate of air bleed through the duct 46 is controlled by a valve 50 which is axially movable to vary the area of the nozzle 48, a piston and cylinder motor 52 being provided for moving said valve. In accordance with the invention, the valve 50 is automatically controlled so as to maintain a constant desired angle of attack on a particular stage of the compressor blades. For this purpose, a shaft 56 is journaled in bearings 58 carried by the rotor of the compressor 14, said shaft extending transversely across said rotor with one end of said shaft projecting into the air flow path. A vane 60 is fixedly secured to said shaft end adjacent to the leading edge of said vane whereby said vane automatically aligns itself with the direction of the local air flow relative to the rotor of the compressor 14. As illustrated, the vane 60 is disposed between the first stage stator blades 18 and the first stage rotor blades 20 of the compressor 14, the axially spacing of said first stage stator and rotor blades being exaggerated in Figure 1 to permit clear illustration of the vane 60. Because the vane 60 is hingedly mounted adjacent to its leading edge, the centrifugal force acting on said vane tends to rotate said vane about its hinge axis. This effect of centrifugal force on the vane 60 is eliminated by suitable counterweight means, schematically indicated at 61, whereby the vane 60 responds only to changes in the direction of and aligns itself with the local air flow.

In order to connect the vane 60 with a servo-mechanism 62, the shaft 56 is provided with a gear 63 meshing with a rack 64 formed on a rod 66 also rotatable with the rotor of the compressor 14. The rod 66 has a swivel connection at 68 with a spool-shaped servo-valve 70 slidable in a cylinder 72 whereby the axial position of the valve 70 depends on the angular position of the vane 60 about its hinge axis. The head ends 74 and 76 of the servo-valve 70 cooperate with radial holes or ports 78 and 80 respectively in the cylinder 72 and said ports respectively communicate with elongate grooves 82 and 84, extending along a bore 85 within the fixed housing of the servo-mechanism 62 and within which the cylinder 72 is slidably mounted. Conduits 86 and 88 are connected at one end with the grooves 82 and 84 respectively and at their other ends with the opposite ends of the piston-cylinder motor 52. A suitable fluid (such as oil) under pressure is supplied to the servo-mechanism through a passage 90, said passage terminating in an elongate groove 92 extending along the bore 85 of the servo-mechanism housing and a radial hole or port 94 in the cylinder 72 supplies said fluid from the groove 92 to the annulus 96 between the head ends 74 and 76 of the servo-valve 70.

Springs 98 and 100 are provided between the servo-valve 70 and the head ends of the cylinder 72 to bias the servo-valve 70 to a central position therein. In addition the cylinder 72 is provided with drain holes 102 and 104 at its ends, said holes communicating with elongate grooves 106 and 108 and passages 110 and 112 respectively in the housing of the servo-mechanism 62. The cylinder 72 also has an axially extending portion 114 (through which the rod 60 extends) said portion having an annular groove 116 formed thereon within which one end of a lever 118 is received so that the axial position of the cylinder 72 within the fixed housing of the servo-mechanism 62 is controlled by said lever.

Referring to Figure 3, air leaves the stator blades 18 in a direction tangent to the trailing edges of said blades. In Figure 3, the rotor blades are assumed to move in the direction of the arrow 119. If the vector $Vs$ represents the velocity of flow of the air relative to the stator blades as said air leaves said stator blades and if the vector $Vb$ represents the velocity of the rotor blades, then the vector $Vr$, representing the velocity of the air relative to said rotor blades is obtained by combining the vectors $Vs$ and $Vb$ and $x$ designates the angle of attack of the air relative to said rotor blades. For a given value of the vector $Vb$, it is apparent that the angle of attack $x$ of the air with respect to the first stage rotor blades will increase and decrease with decrease and increase respectively in the vector $Vs$ and for a given value of the vector $Vs$ the angle of attack $x$ will increase and decrease respectively with increase and decrease in the velocity $Vb$ of the rotor blades. This obviously is true regardless of the stage of rotor blades 20 ahead of which the vane 60 is disposed.

With the structure described, if the angle of attack $x$ of the air on the first stage rotor blades 20 increases, the vane 60 will swing clockwise (as viewed in Figure 3) about the axis of the shaft 56 to align itself with the new direction of the air flow relative to said rotor blades 20. This movement of the vane 60 moves the rod 66 and servo-valve 70 a proportional distance to the right (as viewed in Figures 1 and 2) whereupon the passage 86 is vented at the port 78 to the left hand end of the cylinder 72 and fluid under pressure is supplied from the annulus 96 through the port 80 to the passageway 88 for moving the nozzle valve 50 in a direction to effect an opening of the nozzle 48. The nozzle valve 50 moves in an opening direction until the increase in the bleed air flow therethrough increases the vector $Vs$ to an extent sufficient to restore the angle of attack $x$ to its original value whereupon the servo-valve 70 again similarly covers both ports 78 and 80. In this way the servo-mechanism 62 is automatically operative to position the nozzle valve 50 for varying the rate of air bleed from the compressor assembly so that the angle of attack $x$ of the air on the first stage rotor blades is maintained constant. The magnitude of said angle of attack can be set by axially adjusting the position of the cylinder 72 by means of the lever 118 so that the mechanism can be set to maintain the angle of attack $x$ below the stalling angle of said first stage rotor blades. For example, movement of the cylinder 72 to the left (Figure 2) vents the port 78 and causes fluid under pressure to be supplied to the passage 88 through the port 80 to effect an opening adjustment of the nozzle valve 50 thereby increasing the vector $Vs$ and decreasing the angle of attack $x$ whereupon the vane 60 swings counterclockwise (Figure 3) to move the servo-valve 70 to the left until said valve again similarly covers both ports 78 and 80. Accordingly the angle of attack $x$ maintained by the servo-mechanism 54 can be increased or decreased by moving the cylinder 72 to the right or left respectively (as viewed in Figure 2).

For any given axial flow compressor, it can readily be established that the angle of attack $x$ on any stage of the compressor rotor blades varies inversely with a quantity $Q/N$ in which Q is the volume air flow rate through said compressor and N is the rotative speed (revolutions per minute) of said compressor. Accordingly by maintaining a constant angle of attack $x$ the quantity $Q/N$ is also maintained constant. The quantity $Q/N$ is a basic factor affecting the performance of both axial flow and centrifugal compressors.

With the arrangement described, the vane 60 is rotatable with the compressor rotor blades and said vane automatically aligns itself with the direction of air flow relative to the rotor blades disposed immediately downstream from the vane 60. That is, the vane 60 automatically aligns itself with the vector $Vr$ representing the velocity of air flow relative to said rotor blades. Actually however the angle of attack responsive means could be mounted on the compressor stator structure ahead of a stage of stator blades since an increase in the angle of attack on a particular stage of rotor blades is accompanied by a corresponding increase in the angle of attack on the succeeding stage of stator blades. That this is so can be seen in Figure 4.

Figure 4 illustrates two stages of stator blades 18 with an interposed stage of rotor blades 20. As in Figure 3, the vector $Vs$ represents the exit velocity of the air relative to and from a stage of stator blades, the vector $Vb$ represents the velocity of the rotor blades and the vector $Vr$ represents the velocity of the air relative to said rotor blades whereupon the angle $x$ designates the angle of attack of the air on said rotor blades. The exit velocity of the air relative to and from the rotor blades is tangent to the trailing edge of said blades as indicated by the vector $Vr'$. The velocity $Vs'$ of the air relative to the succeeding stage of stator blades is determined by the combination of $Vr'$ with $Vb$ whereby the angle $y$ represents the angle of attack of the air on said stage of stator blades. It is apparent from Figure 4 that any increase in the angle of attack $x$, because for example of an increase in $Vb$ or a decrease in $Vs$, is accompanied by a corresponding increase in the angle of attack $y$.

Not only may the angle of attack responsive means be disposed on the compressor stator ahead of a stage of stator blades instead of, as illustrated in Figure 1, on the rotor ahead of a stage of rotor blades but in either case other forms of angle of attack responsive means may be provided in place of the vane 60 and the associated servo-mechanism. For example, Figures 4 and 5 illustrate a modified form of angle of attack responsive means 120 which is mounted on the stator ahead of a stage of stator blades 18.

As illustrated in Figures 4 and 5, the angle of attack responsive means 130 comprises a pair of similar Pitot tubes 122 and 124 having their open ends inclined to each other and extending through the wall of a tubular casing 126 within which said Pitot tubes are disposed. The Pitot tube casing 126 is supported on the compressor stator wall 128 (from which the stator blades 18 project radially inwardly) ahead of a stage of stator blades 18, said casing 126 being oriented so that the bisector 130 of the angle between the open ends of the Pitot tubes 122 and 124 is parallel to the vector $Vs'$. With the Pitot tubes so oriented, relative to the direction of air flow, the pressures in said tubes are equal. Upon a change in said direction of the air flow the fluid pressure in one or the other of said Pitot tubes, depending on the direction of said change, will decrease relative to the pressure in the other tube. Figure 5 illustrates an arrangement whereby any pressure difference between the Pitot tubes 122 and 124 is used to vary the position of the nozzle bleed valve 50 so as to restore parallelism between the vector $Vs'$ and the Pitot tube bisector 130 whereby a constant angle of attack $y$ is maintained.

In Figure 5, the Pitot tube casing 126 is supported by and projects through the stator wall 128, said casing having an annular flange 132 seated on an external surface of said stator wall. A plate 134 is secured to the stator wall by screws 136, said plate having a portion extending over the flange 132 to hold said casing 126 in position while permitting rotative adjustment of said casing about its axis. The Pitot tubes 122 and 124 extend from the casing 126 through the plate 134 to pressure fittings 140 and 142 respectively which are connected to a pair of opposed chambers 144 and 146 by passageways 148 and 150 respectively. The chambers 144 and 146 are separated by a flexible diaphragm 152, said diaphragm being connected to a spool-type servo-valve 158 by a rod 160.

The valve 158 is slidable in a bore 161 having vented ends, the head portions 162 and 164 of said valve 158 cooperating with passageways 166 and 168 respectively. A fluid under pressure is supplied to the annular space 170 between the head portions of the valve 158 through a passage 172. The passages 166 and 168 correspond to the passages 86 and 88 respectively of Figure 1 so that the fluid pressure in the passage 166 tends to close the nozzle bleed valve 50 and the fluid pressure in the passage 168 tends to open said valve.

Centering springs 174 and 176 are provided for urging the valve 158 to its central or neutral position (illustrated in the drawing) in which the head ends 162 and 168 of said valve similarly cover their respective passages 166 and 168. The Pitot tube casing 126 has an arm 178 projecting from its flange 132 and the Pitot tubes 122 and 124 are sufficiently flexible to permit said casing to be rotatably adjusted about its axis by the arm 178 in order to change or set the direction of the bisector 130.

With the arrangement of Figures 4 and 5, if the bisector 130 is aligned with the direction of the air flow relative to and entering the adjacent stage of stator blades 18, then the fluid pressures in the Pitot tubes 122 and 124 will be equal so that the servo-valve 158 will be centered in the position illustrated. If however the direction of said air flow should change for example to decrease the angle of attack $y$, then the pressure in the Pitot tube 122 will increase relative to the pressure in the tube 124 whereupon the diaphragm 152 will be subjected to a pressure differential urging the servo-valve 158 to the left (Figure 4). Movement of the servo-valve 158 to the left will admit fluid under pressure to the passage 166 to effect a closing adjustment of the nozzle bleed valve 50 thereby increasing said angle of attack back to the value at which the bisector 130 is again parallel to the vector $Vs'$ and the fluid pressures in the Pitot tubes are again equal. Similarly an increase in the angle of attack $y$ results in a closing adjustment of nozzle bleed valve 50 until the angle of attack $y$ is decreased to the point at which parallelism of the vector $Vs'$ and the bisector 130 and equality of the Pitot tube fluid pressures is again established. Accordingly the arrangement of Figures 4 and 5 operates to vary the compressor air bleed so as to maintain the vector $Vs'$ parallel to the Pitot tube bisector 130 whereby the magnitude of the angle of attack $y$ maintained by the system can be changed by changing the direction of said bisector. As already described the direction of said bisector 130 can be set or changed by rotating the Pitot tube casing 126 by means of the arm 178.

Although the arrangement of Figures 4 and 5 responds to changes in the fluid pressures in the Pilot tube 122 and 124, said arrangement is independent of changes in the density and/or velocity of the air. This is so because the rate of compressor air bleed is automatically controlled to maintain zero pressure differential between said Pitot tubes and this condition of the Pitot tubes depends only on the direction of the air flow being parallel to the bisector 130 and is independent of the velocity and/or density of said air.

The invention so far has been illustrated and described in connection with an axial flow compressor. As will appear however the invention is not so limited but is also applicable to a centrifugal type of fluid compressor since in both types, compressor performance depends on the angle of attack with which the compressor fluid approaches each stage of the compressor blades, said angle varying with the previously described factor $Q/N$. In the case of a positive-displacement type of compressor, however, the factor $Q/N$ is constant (neglecting leakage losses) so that said factor is not one of the variables affecting the performance of positive-displacement type compressors. In the appendant claims, the expression "non-positive displacement type compressor" is intended to include compressors of the axial flow and centrifugal types as well as combinations of axial flow and centrifugal compressors.

Figure 7 illustrates an application of the invention to a centrifugal type compressor assembly having a first stage centrifugal compressor 200 and having a second stage centrifugal compressor 202. The first stage centrifugal compressor 200 comprises a rotor 204 having a plurality of circumferentially-spaced blades 206 projecting therefrom into the annular air flow path and a plurality of circumferentially-spaced fixed diffuser blades 208 are disposed in said path downstream of the rotor blades 206. Similarly the second stage compressor 202 comprises a rotor 210 having a plurality of circumferentially-spaced blades 212 projecting therefrom into the annular air flow path and a plurality of circumferentially-spaced diffuser blades 214 are disposed in said path downstream of the rotor blades 212. The first stage centrifugal compressor 200 receives air from an annular air intake duct 216 and compresses said air into an annular passage 218 from which the second stage compressor 202 further compresses said air into an annular discharge passage 220. As in Figure 1 the compressor assembly of Figure 7 may form part of a gas turbine power plant in which case the compressor assembly supplies air through the passage 220 to a combustion chamber for supplying a gas turbine with motive fluid, said turbine being drivably connected to a shaft 222 for driving the compressor assembly. A duct 224 communicates with the compressor assembly between its first and second stages for bleeding air therefrom and a nozzle valve 226, at the rearwardly directed discharge end of the duct 224, controls the rate of air bleed through said duct.

As in Figure 1, the bleed nozzle valve 226 of Figure 7 is controlled to maintain a substantially constant angle of attack on a stage of compressor blades, for example blades 206, upstream of the point at which air is bled off from the compressor assembly. For this purpose any means responsive to the angle of attack of the air on the blades 206 may be used to control the nozzle valve 226 so as to increase or decrease the rate of said air bleed in response to an increase or decrease respectively in said angle of attack. In Figure 7 a vane 228 is secured to a shaft 230 in the air stream upstream of the rotor blades 206 for alignment with the direction of said air-stream relative to said rotor blades. The vane 228 may control the nozzle valve 226 by mechanism similar to that illustrated in Figures 1 and 2 in which the vane 60 controls the nozle valve 50.

Obviously the angle of attack responsive means of Figures 5 and 6 may be used in Figure 7 in place of the vane 228 and its associated mechanism. Furthermore, in Fig. 7 as in Fig. 1, the air bleed need not be taken from the discharge end of the compressor and instead, as illustrated in Fig. 7, the air preferably is bled off at an intermediate stage of the compressor.

While I have described my invention in detail in its present preferred embodiment, it will be obvious to those skilled in the art, after understanding my invention, that various changes and modifications may be made therein without departing from the spirit or scope thereof. I aim in the appended claim to cover all such modifications.

I claim as my invention:

A gas turbine power plant for aircraft or other vehicles; said power plant comprising a combustion chamber; an axial flow air compressor assembly having a plurality of stages of compressor blades for supplying said combustion chamber with air for combustion with fuel in said chamber; a turbine assembly drivably connected to said compressor assembly and arranged to be driven by gases from said combustion chamber; a first duct having a rearwardly directed nozzle through which the exhaust gases discharge from the turbine assembly; a second duct communicating with said compressor assembly at an intermediate stage of said compressor assembly for bleeding off air from said compressor assembly, said second duct having a rearwardly directed nozzle at its discharge end through which said bleed air discharges into the surrounding atmosphere to add to the power plant thrust; means for adjusting said second duct nozzle for varying its effective discharge area thereby controlling the rate of said air bleed so that said air bleed is a maximum when said second duct nozzle is open to its maximum extent and when said second duct nozzle is closed all the compressor air contributing substantially to the powerplant thrust is supplied to said combustion chamber; and control mechanism for causing operation of said nozzle varying means to maintain a predetermined angle of attack of the compressor air on a stage of compressor blades upstream of said intermediate stage; said control mechanism including means responsive to changes in the direction of the fluid flow over said upstream stage of compressor blades, means adjustable for setting the magnitude of said predetermined angle of attack, means operatively connected to said responsive means and movable in response to deviation in said angle from the set value in a direction and to an extent dependent on the direction and magnitude of said deviation, and means operatively connecting said movable means to said nozzle varying means for adjusting said second duct nozzle upon deviation of said angle of attack from the set value so as to restore said angle of attack to said set value by increasing or decreasing said air bleed to an extent dependent on the magnitude of the increase or decrease respectively in said angle of attack from said set value.

References Cited in the file of this patent

UNITED STATES PATENTS

| | | |
|---|---|---|
| 1,097,259 | Nusim | May 19, 1914 |
| 2,273,458 | Anderson | Feb. 17, 1942 |
| 2,316,452 | Pfenninger | Apr. 13, 1943 |
| 2,343,288 | Fink | Mar. 7, 1944 |
| 2,390,043 | Borden | Dec. 4, 1945 |
| 2,390,161 | Mercier | Dec. 4, 1945 |
| 2,398,619 | Clark et al. | Apr. 16, 1946 |
| 2,458,600 | Imbert et al. | Jan. 11, 1949 |
| 2,463,865 | Gilfillan | Mar. 8, 1949 |
| 2,688,844 | McLeod et al. | Sept. 14, 1954 |

FOREIGN PATENTS

| | | |
|---|---|---|
| 586,572 | Great Britain | Mar. 24, 1947 |
| 612,414 | Great Britain | Nov. 12, 1948 |